United States Patent
Le et al.

(10) Patent No.: US 9,448,783 B2
(45) Date of Patent: *Sep. 20, 2016

(54) SOFTWARE DELIVERY FOR VIRTUAL MACHINES

(71) Applicant: VMware, Inc., Palo Alto, CA (US)

(72) Inventors: Bich Cau Le, San Jose, CA (US); Jagannath Gopal Krishnan, Palo Alto, CA (US); Mike Morris, Belmont, CA (US)

(73) Assignee: VMware, Inc., Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/216,529

(22) Filed: Mar. 17, 2014

(65) Prior Publication Data

US 2014/0201740 A1  Jul. 17, 2014

Related U.S. Application Data

(63) Continuation of application No. 12/060,134, filed on Mar. 31, 2008, now Pat. No. 8,677,351.

(51) Int. Cl.
| | |
|---|---|
| *G06F 9/455* | (2006.01) |
| *G06F 9/46* | (2006.01) |
| *G06F 9/445* | (2006.01) |
| *G06F 9/52* | (2006.01) |

(52) U.S. Cl.
CPC .............. *G06F 8/63* (2013.01); *G06F 9/45558* (2013.01); *G06F 9/52* (2013.01)

(58) Field of Classification Search
CPC ........... G06F 9/455; G06F 9/52; G06F 9/466
USPC ............................................. 718/1, 104, 108
See application file for complete search history.

(56) References Cited

U.S. PATENT DOCUMENTS

| | | | |
|---|---|---|---|
| 6,874,060 B2 | 3/2005 | Blood et al. | |
| 7,233,336 B2 | 6/2007 | Mondal | |
| 7,356,679 B1* | 4/2008 | Le et al. ............................ | 713/1 |
| 8,595,324 B2* | 11/2013 | Carrigan et al. ............... | 709/218 |
| 2003/0054863 A1* | 3/2003 | Lee et al. ....................... | 455/566 |
| 2003/0110244 A1 | 6/2003 | Mondal | |
| 2003/0110351 A1 | 6/2003 | Blood et al. | |
| 2004/0268128 A1 | 12/2004 | Kitani et al. | |
| 2005/0046637 A1 | 3/2005 | Mondal | |
| 2005/0262498 A1 | 11/2005 | Ferguson et al. | |
| 2006/0020779 A1* | 1/2006 | Rothman et al. .................. | 713/2 |
| 2006/0168581 A1 | 7/2006 | Goger et al. | |
| 2008/0163171 A1 | 7/2008 | Chess et al. | |
| 2008/0184354 A1 | 7/2008 | Yamazaki | |
| 2008/0189697 A1* | 8/2008 | Kachroo et al. ............... | 717/171 |
| 2008/0320316 A1 | 12/2008 | Waldspurger et al. | |
| 2010/0058324 A1 | 3/2010 | Hughes et al. | |

* cited by examiner

*Primary Examiner* — Jaweed A Abbaszadeh
*Assistant Examiner* — Phil Nguyen (57) ABSTRACT

One embodiment entails delivering a software payload to guest software in a virtual machine so that the software payload is part of a file system accessible by the guest software, wherein the delivery is such that the software payload is part of a file system accessible by the guest software. The delivering utilizes a virtual device of the virtual machine, but does not involve either a virtual network interface card (NIC) or any virtual host bus adapter (VHBA) of the virtual machine. The delivering further includes establishing a data path from the software payload to the virtual machine and a guest agent of the virtual machine. During processing of the software payload, status from the guest agent is monitored. After reception of the status indicating completion of the processing of the software payload, the data path is deactivated.

29 Claims, 6 Drawing Sheets

SOFTWARE DELIVERY FOR VIRTUAL MACHINES

This application claims the benefit of U.S. patent application Ser. No. 12/060,134, filed on Mar. 31, 2008, granted as U.S. Pat. No. 8,677,351, which claimed priority from U.S. Provisional Application No. 60/920,857, filed Mar. 29, 2007.

BACKGROUND

A common, and perhaps the most common, method for delivering software updates (for example, new software, patches to existing software, data files, antivirus signatures, and the like) to guest software of virtual machines is to treat the virtual machines as physical machines, and to use traditional software delivery techniques. These methods usually fall into two broad categories: agentless and agent-based methods.

In an agentless method, a central update server has access to a repository containing software update payloads. In addition, the central update server has knowledge of client computers on a network it manages. This knowledge is derived through manual user registration, automatic discovery, or a combination of both. The central update server periodically checks which client computers need which updates, if any. Whenever a client computer is in need of an update, the central update server attempts to connect to a guest operating system (OS) running on the client computer. If the connection succeeds, the central update server requests the guest OS to authorize it to carry out operations necessary to deploy the payload onto the client computer. The operations generally include at least (1) copying the payload from the repository over the network into a temporary area in the client computer's disk, and (2) unpacking, applying and/or executing the contents of the copied payload.

One disadvantage associated with the agentless method is unpredictability. For example, the central update server may not be able to connect to unreachable client computers (for example, those that are off the network, or on a different network), and client computers that have accounts and passwords unknown to the central update server, or client computers that have restricted incoming traffic through use of a firewall.

The agent-based method attempts to alleviate these issues arising in the agentless method by installing a specific agent on each client computer that needs to be managed. The central update server communicates with the agent, which then communicates with the local guest OS to coordinate the payload deployment process. The presence of the agent can result in better predictability because it establishes a pre-authorized channel between the central update server and the client computer. Also, by regularly obtaining status from agents, the central update server can detect, and try to resolve, any network or authorization problems before the next deployment operation.

Agents, however, introduce a new management problem because they must themselves be deployed, installed, and updated. It is also common for multiple software applications to provide their own update infrastructure, resulting in a proliferation of agents which compounds the problem. Moreover, there can be increased cost and complexity in deploying and managing additional agents on each virtual machine.

Note that when client computers are virtual machines, more points of potential failure are introduced. For example, a virtual infrastructure administrator needs to ensure that managed client computers are configured to attach to a virtual network that is accessible from the central update server. For example, a popular use of virtual machines is in test and development; in such configurations, virtual machines are commonly placed on isolated virtual networks that may not be accessible to the central update server. Even if a virtual machine's network is properly configured, the virtual machine's virtual NIC (network interface card) must also be set to a "connected" state to communicate on the network.

Also note that delivering software updates to guest software of virtual machines using a traditional server-to-client method can adversely affect network performance when multiple copies of the same software updates are sent to individual client computers. Specifically, it does not scale well to large numbers of client computers.

SUMMARY OF THE INVENTION

In accordance with one embodiment, a software payload is delivered to guest software in a virtual machine so that the software payload is part of a file system accessible by the guest software, wherein delivery is to the guest software such that the software payload is part of a file system accessible by the guest software. The delivering utilizes a virtual device of the virtual machine, but does not involve either a virtual network interface card (NIC) or any virtual host bus adapter (VHBA) of the virtual machine. The delivering further includes establishing a data path from the software payload to the virtual machine and a guest agent of the virtual machine. While the software payload is processed within the virtual machine, status from the guest agent is monitored, wherein the status relates to the processing of the software payload. After reception of the status indicating completion of the processing of the software payload, the data path is deactivated.

DETAILED DESCRIPTION

It should be appreciated that one or more embodiments of the present invention can be used with both hosted and non-hosted virtual machines (VMs), with partially virtualized systems (regardless of the degree of virtualization), and with VMs with any number of physical and/or logical virtualized processors. The Appendix discusses virtualization technology. Moreover, one or more embodiments of the present invention may be implemented wholly or partially in hardware, for example and without limitation, in processor architectures intended to provide hardware support for VMs. Additionally, one or more embodiments of the present invention may also be implemented directly in a computer's primary operating system (OS), both where the OS is designed to support virtual machines, and where it is not.

One or more embodiments of the present invention are directed toward methods and systems for software delivery to virtual machines. In accordance with one or more such embodiments, a virtual machine infrastructure is used to enable reliable communication with a guest operating system, which virtual infrastructure generally includes a management network that interconnects: (a) a management server (for example, a VMware VirtualCenter software product available from VMware, Inc. of Palo Alto, Calif.); (b) virtual machine hosts (for example, a VMware ESX server software product available from VMware, Inc. of Palo Alto, Calif. provides a virtual machine host); and (c) a guest agent running in virtual machines (e.g., a VMware Tools software product available from VMware, Inc. of Palo Alto, Calif. provides a guest agent). In addition, in accordance with one or more embodiments of the present invention, the guest agent is extended to participate in the software update process, and a host-to-guest agent link is provided over a communications channel that is referred to herein as backdoor. Advantageously, by extending the guest agent to participate in the software update process, the high availability and reliability of the management network is leveraged to minimize or eliminate a risk of network configuration and authentication problems. In further addition, in accordance with one or more such embodiments, at least one or more of three methods for delivery of a software update payload are supported: (a) a backdoor method; (b) a hot-add method; and (c) a hot-insert method which is a variation of the hot-add method. Specifically, in accordance with one or more such embodiments, the backdoor method uses a {virtual machine host}-to-{guest agent} link implemented over a communications channel called a backdoor channel (or backdoor) where the backdoor channel is used to send the software update payload to the guest operating system. As will be set forth in more detail below, depending on virtual machine and host computer configuration, the backdoor method involves up to two copy operations in the worst case, and none (zero) in the best case). In accordance with one or more such embodiments, the hot-add method entails placing a software update payload on a formatted virtual disk ("VD"), and dynamically connecting the virtual disk to a virtual machine so that a guest OS and a guest agent in the VM can access the software update payload directly. Lastly, in accordance with one or more embodiments, the hot-insert method is a variation of the hot-add method wherein a virtual CD, for example, a CD-ROM (or virtual DVD, for example, a DVD-ROM) disc containing the software update payload is virtually inserted into the virtual machine's virtual CD drive, for example, a CD-ROM drive (or virtual DVD drive, for example, virtual DVD-ROM drive). The hot-add and hot-insert methods usually involve zero copy operations.

Figure 3:
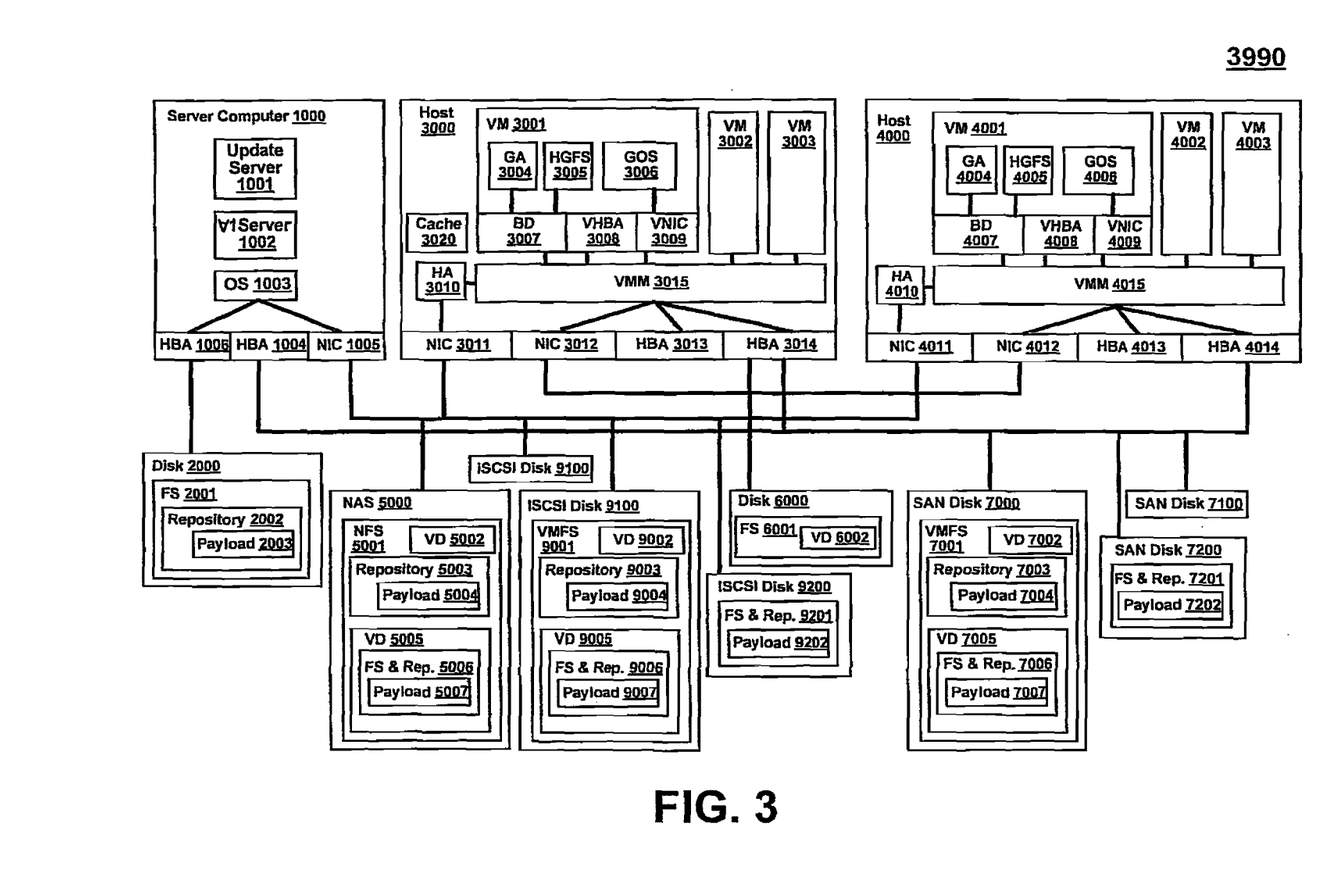
FIG. 3 is a block diagram of a virtual machine (VM) infrastructure that is fabricated in accordance with one or more embodiments of the present invention.

FIG. 3 is a block diagram of virtual machine (VM) infrastructure 3990 that is fabricated in accordance with one or more embodiments of the present invention. As shown in FIG. 3, virtual machine infrastructure 3990 includes host computers (for example, host computers 3000 and 4000) equipped with virtual machine manager software (for example, VMMs 3015 and 4015) that can host one or more virtual machines (for example, VMs 3001-3003 and 4001-4003, respectively). It is appreciated that in accordance with one or more embodiments of the present invention, the virtual machine manager software (for example, VMM 3015 and/or VMM 4015) can be: (a) a "Virtual Machine Monitor" having direct access to its host computer's hardware devices, a design used by a VMware ESX Server 3.0 product that is available from VMware, Inc. of Palo Alto, Calif.; (b) a combination of a hypervisor (see the Appendix) and a special-purpose virtual machine used to manage the hardware (for example, a design used by Xen 3.0 software available from XenSource UK Ltd, of London, England; or (c) the like. Note that a virtual machine monitor having direct access is sometimes be referred to as "hypervisor."

A virtual machine such as VM 3001 running on host computer 3000 can be equipped with several virtual devices such as, for example and without limitation: (a) one or more virtual host bus adapters (for example, VHBAs 3008 and 4008) to provide access to disks; (b) one or more virtual CPUs (not shown); (c) one or more virtual network interface cards (for example, VNIC 3009) to provide access to networks; and (d) one or more specialized communications devices, such as, for example and without limitation, backdoor 3007 (BD 3007) that enables software in VM 3001 to interact directly with a virtual machine monitor (for example, underlying VMM 3015).

When VM 3001 shown in FIG. 3 is active, i.e., powered on, it is allocated virtual random access memory (VRAM). In addition, a boot sequence loads software (the "guest" or "guest software") from one or more disks of VM 3001, where such software includes, for example and without limitation, guest operating system 3006 (GOS 3006), and virtual infrastructure-specific components such as guest agent 3004 (GA 3004). Note that guest agent 3004 is typically a collection of software (for example and without limitation, drivers, daemons, services, libraries, scripts, or any combination thereof) that can affect the performance, manageability, and/or ease of use of VM 3001 within virtual machine infrastructure 3990. For example, the guest software can include a "host-guest file system" (HGFS) component 3005 (HGFS 3005) that enables host computer 3000 and GA 3004 to share files. Note, for example and without limitation, that HGFS 3005 can be a network file system that enables accessing of files on remote servers using BD 3007 instead of a guest network stack.

In accordance with one or more embodiments of the present invention, GA 3004 and HGFS 3005 can communicate with components of virtual machine infrastructure 3990 outside VM 3001 through BD 3007. Further, the communication method can depend on VMM software 3015. In particular, and in accordance with one or more such embodiments, BD 3007 enables two components to communicate through an input/output (I/O) port that can be viewed as a software communication pipe. In addition and in accordance with one or more further such embodiments, two components may use shared memory to communicate. However, it should be understood that embodiments of the present invention are not limited by these examples. In accordance with one or more such embodiments, the software communication pipe embodied using BD 3007 can be used to exchange control messages or data, or both, and in both directions. For example and without limitation, host computer 3000 and GA 3004 can notify each other of the presence of a message and/or data in the software communication pipe using any one of a number of methods that are well-known to those of ordinary skill in the art, including but not limited to, traps, interrupts, and polling.

In accordance with one or more embodiments, a VM configuration (usually stored as a data file) can specify disks that are visible to the VM (for example, VM 3001) through the host bus adapters (for example, HBAs 3013 and 3014). In accordance with one or more such embodiments, a VMM (for example, VMM 3015) controls a mapping between disks visible to the VM, and actual objects that provide storage for them. In particular, and in accordance with one or more such embodiments, a VM's disks can be mapped in a number of different ways. For example and without limitation, a VM disk can be mapped to a virtual disk file in a private disk file system that can be directly attached to the host computer. For example, in accordance with one or more embodiments, virtual disk 6002 (VD 6002) stored in file system 6001 (FS 6001) (for example, FS 6001 is an "ext3" file system) on disk 6000 can be directly attached to host computer 3000 through HBA 3014. Additionally, for example, and in accordance with one or more embodiments, a VM disk can be mapped to a virtual disk file on a shared file system that can be accessed by multiple hosts. It should be appreciated that the file system can be a distributed disk file system such as, for example and without limitation, a Virtual Machine File System (VMFS) available from VMware, Inc. that resides on a shared disk. Note that, in accordance with one or more embodiments of the present invention, the file system can be virtual disk 7002 (VD 7002) (on VMFS 7001 on disk 7000 which is attached through storage area network 8003 (SAN 8003) to HBA 3014); or virtual disk 9002 (on VMFS 9001 on iSCSI disk 9000 which is attached through local area network 8002 (LAN 8002) (for example, an IP network) to NIC 3011). In addition, in accordance with one or more embodiments of the present invention, the file system can also be a network file system exported by a network attached storage (NAS) "filer," (for example, virtual disk 5002 stored on network file system 5001 (NFS 5001) belonging to filer 5000 which is attached through local area network 8002 (LAN 8002) to NIC 3011). In further addition, and in accordance with one or more embodiments of the present invention, a VM disk can be mapped to an entire physical disk, for example SAN disk 7100 or iSCSI disk 9100. Note that this type of mapping can sometimes be called "raw" because a virtual machine can access the raw storage of a physical disk.

As shown in FIG. 3, in accordance with one or more embodiments of the present invention, virtual machine infrastructure 3990 can include, without limitation, server computer 1000 that can be coupled to both host computers 3000 and 4000. Note that virtual machine infrastructure 3990 can include more or less components than those shown in FIG. 3. As further shown in FIG. 3, server computer 1000 can include, without limitation, update server 1001, VI server 1002, OS 1003, NIC 1005, and HBAs 1004 and 1006 wherein OS 1003 is coupled to NIC 1005 and HBAs 1004 and 1006. It should be understood that server computer 1000 can include more or less components than those shown in FIG. 3. In accordance with one or more embodiments of the present invention, server computer 1000 is coupled to physical disk 2000 via HBA 1006, and disk 2000 can include file system 2001 (FS 2001), and FS 2001, in turn, includes repository 2002 which includes payload 2003. In further addition, and in accordance with one or more embodiments of the present invention, server computer 1000 is coupled to LAN 8002 via NIC 1005 and server computer 1000 is coupled to SAN 8003 via HBA 1004. As further shown in FIG. 3, NAS 5000 is coupled to LAN 8002, and NAS 5000 includes NFS 5001, wherein NFS 5001 includes VD 5002, repository 5003, and VD 5005. Still further, as is also shown in FIG. 3, repository 5003 includes payload 5004 and VD 5005 includes file system and repository 5006 (FS & Rep. 5006), wherein FS & Rep. 5006 includes payload 5007. As still further shown in FIG. 3, iSCSI disks 9000, 9100 and 9200 are each coupled to LAN 8002. Further, as shown in FIG. 3, iSCSI disk 9100 includes VMFS 9001 wherein VMFS 9001 includes VD 9002, repository 9003, and VD 9005. Still further, as is also shown in FIG. 3, repository 9003 includes payload 9004 and VD 9005 includes file system and repository 9006 (FS & Rep. 9006), wherein FS & Rep. 9006 includes payload 9007. As still further shown in FIG. 3, iSCSI disk 9200 includes file system and repository 9201 (FS & Rep. 9201), wherein FS & Rep. 9201 includes payload 9202. Note that SAN disks 7000, 7100, and 7200 are each coupled to SAN 8003. Further, as is also shown in FIG. 3, SAN disk 7200 includes file system and repository 7201 (FS & Rep. 7201), wherein FS & Rep. 7201 includes payload 7202. As still further shown in FIG. 3, SAN disk 7000 includes VMFS 7001, and VMFS 7001 includes VD 7002, repository 7003, and VD 7005. Finally, as shown in FIG. 3, repository 7003 includes payload 7004 and VD 7005 includes file system and repository 7006 (FS & Rep. 7006), wherein FS & Rep. 7006 includes payload 7007.

As shown in FIG. 3, virtual machine infrastructure 3990 includes host computer 3000, which includes VMs 3001, 3002 and 3003, cache 3020, host agent 3010 (HA 3010), VMM 3015, NICs 3011 and 3012, and HBAs 3013 and 3014. In particular, as shown in FIG. 3, VMM 3015 is coupled to each of VMs 3001-3003, HA 3010, NIC 3012, and HBAs 3013 and 3014. As further shown in FIG. 3, VM 3001 includes GA 3004, HGFS 3005, BD 3007, GOS 3006, VHBA 3008, and VNIC 3009. Note that: (a) GA 3004 and HGFS 3005 can each be coupled to BD 3007, (b) BD 3007 can be coupled to VMM 3015; (c) GOS 3006 can be coupled to VNIC 3009; (d) VNIC 3009 can be coupled to VMM 3015; (e) VHBA 3008 can be coupled to VMM 3015; (f) NIC 3011 can be coupled to LAN 8002 and HA 3010; (g) NIC 3012 can be coupled to LAN 8001; (h) HBA 3013 can be coupled to disk 6000; and (i) HBA 3014 can be coupled to SAN 8003. As further shown in FIG. 3, disk 6000 includes FS 6001 and FS 6001 includes VD 6002.

As shown in FIG. 3, virtual machine infrastructure 3990 can include host computer 4000, which includes VMs 4001, 4002 and 4003, HA 4010, VMM 4015, NICs 4011 and 4012, and HBAs 4013 and 4014. In particular, as shown in FIG. 3, VMM 4015 is coupled to each of VMs 4001-4003, HA 4010, NIC 4012, and HBAs 4013 and 4014. As further shown in FIG. 3, VM 4001 includes GA 4004, HGFS 4005, BD 4007, GOS 4006, VHBA 4008, and VNIC 4009. Note that: (a) GA 4004 and HGFS 4005 can each be coupled to BD 4007; (b) BD 4007 can be coupled to VMM 4015; (c) GOS 4006 can be coupled to VNIC 4009; (d) VNIC 4009 can be coupled to VMM 4015; (e) VHBA 4008 can be coupled to VMM 4015; (f) NIC 4011 can be coupled to LAN 8002 and HA 4010; (g) NIC 4012 can be coupled LAN 8001; and (h) HBA 4014 can be coupled to SAN 8003.

Figure 4:
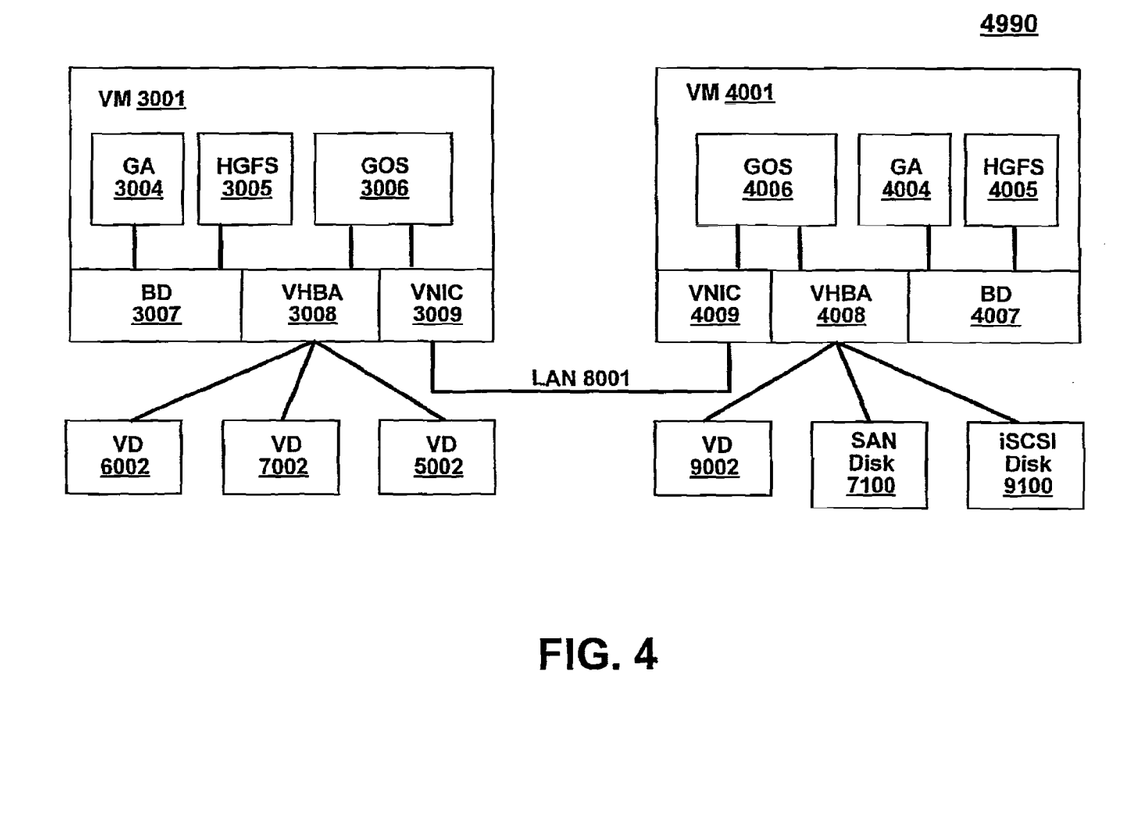
FIG. 4 is a block diagram of a virtual machine infrastructure that is fabricated in accordance with one or more embodiments of the present invention.

In accordance with one or embodiments of the present invention, a configuration of a VM specifies connections between its virtual NICs and IP networks, real or virtual. For example, as shown in FIG. 4, virtual machine infrastructure 4990 comprises VMs 3001 and 4001 connected to LAN 8001. In accordance with one or more embodiments of the present invention, LAN 8001 is isolated from LAN 8002 which is used for virtual infrastructure management and storage devices. In accordance with one or more embodiments of the present invention, it is also possible for virtual machines and physical elements to share a single network (for example, an IP network).

As further shown in FIG. 4, from the perspective of virtual machines 3001 and 4001, and in accordance with one or more embodiments of the present invention, VM 3001 includes three disks which are mapped to VD files 5002, 6002 and 7002, respectively. Typically, from the perspective of VM 3001, VDs 5002, 6002 and 7002 appear to be direct-attached. In addition, and in accordance with one or more embodiments of the present invention, VM 4001 includes three disks, one mapped to VD 9002 while the other two are mapped to raw physical devices (for example, SAN disk 7100 and iSCSI disk 9100). As shown in FIG. 4, VMs 3001 and 4001 are connected via LAN 8001, and can thus communicate with each other.

As shown in FIG. 4, virtual machine infrastructure 4990 includes VMs 3001 and 4001, VDs 5002, 6002, 7002, and 9002, SAN disk 7100, iSCSI disk 9100, and LAN 8001. However, one should understand that virtual machine infrastructure 4990 can include more or less components than those shown in FIG. 4. In addition, as shown in FIG. 4, VM 3001 includes GA 3004, HGFS 3005, GOS 3006, BD 3007, VHBA 3008, and VNIC 3009. Further, as shown in FIG. 4: (a) GA 3004 and HGFS 3005 can be coupled to BD 3007; (b) GOS 3006 can be coupled to VHBA 3008 and VNIC 3009; and (c) VHBA 3008 can be coupled to VDs 5002, 6002, and 7002. In addition, as shown in FIG. 4, VM 4001 includes GA 4004, HGFS 4005, GOS 4006, BD 4007, VHBA 4008, and VNIC 4009. Further, as shown in FIG. 4: (a) GA 4004 and HGFS 4005 can be coupled to BD 4007; (b) GOS 4006 can be coupled to VHBA 4008 and VNIC 4009; and (c) VHBA 4008 can be coupled to VD 9002, SAN disk 7100, and iSCSI 9100. Lastly, VM 3001 can be coupled to VM 4001 and, in particular, VNICs 3009 and 4009 can each be coupled to LAN 8001.

As shown in FIG. 3, in accordance with one or more embodiments of the present invention, to consolidate and simplify management of hosts and their virtual machines, virtual machine infrastructure 3990 includes virtual infrastructure server program 1002 (VIS 1002) that communicates with a host computer over LAN 8002. In accordance with one or more embodiments of the present invention, server 1000 can communicate with a VMM of a host computer (for example, VMM 3015 of host computer 3000) directly or through a proxy called a host agent (for example, HA 3010). In accordance with one or more such embodiments of the present invention, virtual infrastructure management network 3990 can include links among the HA (for example, HA 3010), the VMM (for example, VMM 3015), and the guest agent (for example, GA 3004). As such, this enables VIS 1002 to manage and control host computers and virtual machines, and to a certain extent, guest software running inside virtual machines. Note that, in accordance with one or more such embodiments of the present invention, the guest agent may be integrated into the VMM.

In accordance with one or more embodiments of the present invention, a set of extensions to virtual machine infrastructure 3990 can provide a mechanism for update server 1001 shown in FIG. 3 to deploy a specified payload to a specified virtual machine (for example, VM 3001 and the like). Note that update server 1001 can run on any computer in virtual machine infrastructure 3990. The design of update servers is well understood by those of ordinary skill in the art. For example, FIG. 3 shows an exemplary configuration where update server 100 can operate on the same computer, i.e., computer 1000 that runs virtual infrastructure (VI) server 1002.

In accordance with one or more embodiments of the present invention, update servers (for example, update server 1001) can include responsibilities of, for example and without limitation: (a) detecting which virtual machines need software updates; (b) determining updates needed by out-of-date virtual machines; and (c) obtaining software updates (for example and without limitation, by downloading them from the Internet).

In accordance with one or more embodiments of the present invention, a repository is provided for update server 1001 to use to store and manage software updates. In accordance with one or more such embodiments, the repository can be a folder of a file system. It should be understood that the file system may reside on any one of a number of storage devices, depending on deployment method. In accordance with one or more embodiments of the present invention, a choice of repository location can depend on a payload delivery method. However, after a repository location is chosen, a virtual infrastructure ("VI") administrator can configure update server 1001 and VIS 1002 to use that repository location to store software updates (or any other software to be installed). Note that term "payload" herein can denote the total content that update server 1001 wishes to deploy to a virtual machine (for example, VM 3001) for an update operation. The payload comprises, for example and without limitation, software updates (for example, patches, data files, software installers, and the like), and optionally, an installation program (or script). The installation program or script is designed to run inside a virtual machine (for example, VM 3001), and its purpose is to apply and/or execute the software updates, and optionally to send commands to the guest operating system (for example, GOS 3006), for example and without limitation, to reboot if necessary. The payload can be, for example and without limitation, a collection of files, or a self-executing/extracting container for the files (for example, an executable (.exe) file or a zip file).

In accordance with one or more embodiments of the present invention, a service can be provided whose interface can be expressed as an exemplary procedure that looks like, for example and without limitation:

DeployUpdates(payload_specification, VM_specification, optional_credentials)

wherein the "payload_specification" specifies updates and/or scripts to be deployed, and the location of the repository that contains them. In accordance with one or more such embodiments of the present invention, the software updates can be identified by the names of their files, but are not limited to such. Note that, in accordance with one or more embodiments of the present invention, an identifier of the repository location can be a string that identifies a file system containing the repository, and a path of the repository within that file system. It should be understood that such a string can be implemented in a wide variety of ways. For example and without limitation, the following string indicates that the payload resides on a file system local to the server: c:\repository_name\payload_name; the following string indicates that the payload resides on a CIFS filer: \\fileserver_name\repository_name\payload_name; the following string indicates that the payload resides on an NFS filer:/fileserver_name:/repository_name/payload_name; and the following string indicates that the payload resides on a VMware VMFS distributed datastore: [datastore_name]/repository_name/payload_name.

Note that the "VM_specification" of the above exemplary "DeployUpdates" procedure can identify the virtual machine (for example, VM 3001) on which to deploy the payload. Note also that the format of the VM identifier can depend on the virtual machine infrastructure environment in which it is utilized. For example, in accordance with one or more embodiments of the present invention, the identifier could be a "globally unique identifier" for the virtual machine; it could also be composed of a host name and the name of a configuration file on the host that represents that virtual machine.

Further note that the "optional_credentials" of the above-described exemplary "DeployUpdates" procedure can optionally specify a username and password to authorize the software deployment operation. Further, those credentials can be validated by authentication and authorization providers of the computing environment.

In accordance with one or more embodiments of the present invention, virtual machine infrastructure 3990 and its management network control the update process so that authentication and authorization can be handled by VIS 1002. Advantageously, such a single point of access control can ensure that once an update request is authorized, the update process will be able to proceed without risk of being blocked by any guest OS-specific security policies. In an embodiment where a virtual infrastructure ("VI") administrator configured multiple isolated networks, i.e., one for VI management (for example, LAN 8002), and one or more for general VM communication (for example, LAN 8001), the one used for VI management is typically more likely to be better maintained, secured, and thus less prone to outages. Since most virtual machines (for example, VM 3001) are configured with a guest agent (for example, GA 3004) and a backdoor (for example, BD 3007), control messages can be sent to and from guest software with high reliability because the control messages can bypass the VM's virtual NIC, network stack, and guest OS security policies (including firewalls).

In accordance with one or more embodiments of the present invention, referring to FIG. 3, update server 1001 can send a "DeployUpdates" request (described above) to an update controller (not shown). In accordance with one or more such embodiments of the present invention, the update controller can be a software component that causes various operations of an update process to be carried out. In accordance with one or more such embodiments of the present invention, the update controller can be embodied as a standalone program that can interact with VIS 1002 through an application programming interface (API) to carry out the operations of the update process. Alternatively, the update controller can be integrated into VIS 1002. In accordance with such an embodiment, update server 1001 can send the request to VIS 1002 directly.

Referring to FIG. 3, it should be appreciated that utilizing a VM identifier enables VIS 1002 to find the host computer (for example, host computer 3000), the host agent (for example, HA 3010), the virtual machine monitor (for example, VMM 3015), and the guest agent (for example, GA 3004) for that virtual machine (for example, VM3001). Note that this information retrieval can be performed using information that VIS 1002 stores in its internal database, but is not limited to such.

Then, in accordance with one or more embodiments of the present invention, VIS 1002 can then send a message to the guest agent (for example, 3004) instructing it to prepare for an update or install operation. Note that the actual delivery of the message can be processed by a combination of the host agent (for example, HA 3010), the VMM (for example, VMM 3015) and the backdoor device (for example, BD 3007). It should be understood that the message can be implemented in any one of a number of ways that are well known to those of ordinary skill in the art. For example, in accordance with one or more such embodiments of the present invention, the message can include, but is not limited to, the following information: how the payload will be delivered to the VM; the location of the payload in the guest's file name space, and/or information and instructions on how to process the payload. As for the location of the payload, depending on the payload delivery method, this location may be specified by VIS 1002, or negotiated between the guest agent (for example, GA 3004) and VIS 1002, the VMM (for example, VMM 3015), or the HA (for example, HA 3010). The information and instructions on how to process the payload can be implemented in any one of a number of ways. For example and without limitation, exemplary information and instructions can include "the payload is a compressed archive; decompress it, unpack it, and execute a program or script contained in the archive to initiate the update installation process." It should be understood that this information can be specified explicitly in the message, or implicit, for example, pre-negotiated between VIS 1002 and the guest agent (for example, GA 3004) in accordance with any one of a number of methods that are well known to those of ordinary skill in the art.

Referring to FIG. 3, VIS 1002 can then deliver the payload to the VM using one of the methods described herein. Note that the delivery operation may involve participation of the guest agent (for example, GA 3004). A successful delivery can result in the payload being "visible" to the guest software, for example, including the guest OS (for example, GOS 3006), the guest agent (for example, GA 3004), and guest applications. As such, this means the payload can appear as one or more files in the guest's file system name space.

Then, the guest agent (for example, GA 3004) can process the payload, for example, by using pre-negotiated or explicitly specified instructions. Such processing can be specific to the payload type, the updates that it contains, and/or the type of guest OS, and may include, one or more of the following operations: uncompressing and unpacking the payload if it is an archive of files; copying files (for example, virus signature files) to specific folders of the guest; launching executable program files (for example, patches); rebooting the guest OS; and cleaning up/deleting files.

Referring to FIG. 3, the guest agent (for example, GA 3004) may communicate status updates to VIS 1002 during the update process. When the process finishes, the guest agent (for example, GA 3004) can return a final status to VIS 1002 indicating whether or not the overall operation failed or succeeded. This status may optionally include a log of operations that were executed.

After payload processing ends, VIS 1002 may perform some clean-up work to undo any side effects of the payload delivery operation (for example and without limitation, deleting temporary copies of the payload). Finally, VIS 1002 can return a status to the update server (for example, update server 1001) to indicate whether or not the overall update operation was successful.

In accordance with one or more embodiments, one purpose of the payload delivery operation is to make the payload "appear" in the guest software's file name space so that it can be processed by the guest agent (for example, GA

3004). This can mean making the payload (or a copy of it) appear on a file system accessible by the guest OS (for example, GOS 3006).

In accordance with one or more embodiments of the present invention, any data path is avoided that involves a general network stack (for example, a TCP/IP stack) of a VM. Advantageously, this avoids problems related to unreliable VM networks and authentication/authorization issues caused by guest OS security policies. In this regard, note that, in accordance with one or more embodiments of the present invention, the backdoor device (for example, BD 3007) or the virtual HBA (for example, VHBA 3008) may be used to deliver the payload to the guest. It should be understood that the specific method utilized for delivery can be determined by, but is not limited to, virtual machine infrastructure capabilities, host computer configuration, and administrator preferences.

In accordance with one or more embodiments, the efficiency of a chosen method for delivery can be measured by the number of additional copies of the payload that are created (and ultimately deleted) during deployment. For example, the backdoor method, as its name implies, relies on a backdoor device (for example, BD 3007) to transmit the payload to the guest. Depending on the configuration of the virtual machine infrastructure (for example, virtual machine infrastructure 3990), the number of copy operations involved in transmitting the payload can range from 2 to 0. The following discussion uses an example that assumes the target guest runs on VM 3001 which is hosted by host computer 3000 shown in FIG. 3.

Backdoor Method: For a 2-copy configuration of virtual machine infrastructure 3990, repository 2002 is stored in private file system 2001 (FS 2001) on disk 2000 that can be coupled to server computer 1000 which hosts VIS 1002. In this example, assume that the guest is not equipped with an HGFS component, or if it is equipped with one, the HGFS component has been disabled by a virtual infrastructure administrator (for example, possibly because of security concerns). Since payload 2003 in repository 2002 shown in FIG. 3 is not directly visible to host computer 3000, VIS 1002 copies payload 2003 over network 8002 to cache 3020 on host computer 3000—VIS 1002 interacts with host agent 3010 (HA 3010) to authorize the data transfer. Cache 3020 can be a folder on a file system directly accessible by host computer 3000, and is most naturally managed by either HA 3010 or VMM 3015. It should be understood that space for cache 3020 can be managed using any one of a number of well-known cache management methods, including but not limited to: no management at all (for example, let cache 3020 grow in size until it is manually trimmed by a human administrator); limit the size, and when full, delete the oldest payload(s); or limit the size, and when full, delete the least recently used payload(s). It should be appreciated that HA 3010 may employ an optimization that could save a copy operation. For example, in accordance with one or more embodiments, HA 3010 can check if cache 3020 already contains a copy of payload 2003 that VIS 1002 intends to transfer. Note that this optimization can be valuable where the same payload 2003 is delivered to multiple VMs on the same host computer (for example, host computer 3000). The check can be performed using any one of a number of methods that are well known to those of ordinary skill in the art, such as but not limited to, a check based on payload name(s); or a check based on a hash (a.k.a. "digest") of the payload contents using an algorithm such as MD5. Once cache 3020 holds a copy of payload 2003, VIS 1002 instructs HA 3010/VMM 3015 to transfer the contents of payload 2003 into the guest through BD 3007. This results in a second copy of payload 2003. In accordance with one or more embodiments of the present invention, VMM 3015 can negotiate with GA 3004 where in the guest's file system space the second copy of the payload 2003 will be placed. For example, and without limitation, GA 3004 select a folder that guest OS 3006 normally uses to store temporary files. It should be appreciated that this file system can reside on one of the VM's disks, but is not limited to such.

For a 1-copy configuration of virtual machine infrastructure 3990, the need for a cache (and one copy operation) can be eliminated when the repository resides on a file system that is simultaneously visible to update server 1001, VIS 1002, and the target host computer (for example, host computer 3000). FIG. 3 illustrates several such exemplary configurations. For example in one embodiment, repository 5003 can reside on network file system (NFS) 5001 to which it had been exported by NAS filer 5000 over network 8002. In another embodiment, repository 9003 can reside on distributed Virtual Machine File System (VMFS) 9001 on iSCSI disk 9100 which is coupled to network 8002. In still another embodiment, repository 7003 can reside on distributed Virtual Machine File System (VMFS) 7001 on SAN disk 7000 which is coupled to storage area network (SAN) 8003.

It should be understood that in any of the embodiments mentioned above, HA 3010/VMM 3015 can now copy the original payload (for example, payload 5004, 7004, or 9004) directly from the repository (for example, repository 5003, 7003, or 9003) into the guest.

For a 0-copy configuration of virtual machine infrastructure 3990, if an HGFS (file sharing) component is present and enabled in the guest, VIS 1002 can instruct HA 3010 and/or VMM 3015 to configure it to create a virtual file system within the guest, and map that virtual file system directly to a specific file system folder visible to host computer 3000—this folder is the repository itself. As such, software in the guest can now "see" the payload directly, and GA 3004 can load the payload into memory, and process it immediately without creating additional copies of it. (Note that opening and reading the payload can result in I/O operations that can be transmitted over BD 3007 and forwarded to the repository's file system).

It should be appreciated that when a deployment operation through the backdoor (for example, BD 3007) is completed, any temporary copy of the payload (for example, payload 2003) present in the guest's file system space can be deleted. If a payload cache (for example, cache 3020) is used, various embodiments of the invention can leave the payload copy in the cache. In this manner, this copy may get reused (for example, if another VM on the same host computer needs the same payload), and can be eventually purged by the cache's own management algorithm.

Note that unless the HGFS component is present and enabled in the guest, the backdoor method involves at least one copy operation. When the payload is very large (for example, Windows service packs which can be hundreds of megabytes in size), this copy operation can negatively impact performance, and it also adversely uses up a significant amount of storage space.

Hot-Add Method:

In accordance with one or more embodiments of the present invention, a hot-add method can provide zero-copy performance. The hot-add method does not use the backdoor (for example, BD 3007) for data movement, instead it is only used for control operations. For example, in accordance with the hot-add method, the repository is placed on a file system residing on a disk, and then the disk is dynamically attached (i.e., hot-added) to the target virtual machine by connecting the disk to one of the VM's virtual HBAs. In accordance with one or more such embodiments, the connected disk appears like any local disk to the guest OS (for example, GOS 3006). As such, this enables the guest OS (for example, GOS 3006) to mount the disk's file systems into the guest's file name space, thereby, making their contents accessible to all guest programs, including the guest agent (for example, GA 3004). When guest software accesses files on the added disk, any resulting I/O operation is processed through the virtual HBA device (for example, VHBA 3008) onto which the disk was attached, and ultimately, the resulting I/O operation can be handled by the VMM (for example, VMM 3015). Since a VMM (for example, VMM 3015) can attach a variety of disk types to a VM, the repository can be placed on any one of such disks. For example in one embodiment, the disk can be a virtual disk file, such as, payload 5007 in repository 5006, where the root folder of a file system on virtual disk (VD) file 5005 resides on network file system 5001, and is accessible to the host computer through LAN 8002. In another embodiment, the disk can be a virtual disk file, such as, payload 7007 in repository 7006, where the root folder of a file system on virtual disk file 7005 resides on distributed Virtual Machine File System 7001 which resides on SAN disk 7000, and is accessible to the host computer through storage area network (SAN) 8003. In still another embodiment, the disk can be a virtual disk file, such as, payload 9007 in repository 9006, where the root folder of a file system on virtual disk file 9005 resides on distributed Virtual Machine File System 9001 which resides on iSCSI disk 9000, and is accessible to the host computer through LAN 8002. In accordance with one or more embodiments, the disk can also be a physical disk attached to the VM in a "raw" mapping mode, such as, when repository 7201 of FIG. 3 is the root folder of a file system on SAN disk 7200 which is accessible to the host computer through storage area network 8003. In accordance with another embodiment, the disk can be a physical disk attached to the VM in a "raw" mapping mode, such as, when repository 9201 is the root folder of a file system on iSCSI disk 9200 which is accessible to the host computer through LAN 8002.

Note that the hot-add method, introduces issues that are resolved in accordance with one or more embodiments of the present invention that are described below. In the hot-add method, the guest has direct access to the repository which is on a file system shared with update server 1001: update server 1001 writes payloads to the repository, and the guest reads and deploys the payloads. While this is happening, it is generally not safe to hot-add the same disk to another guest because the guest OSs of the two VMs would not know about each other, and their file system drivers could accidentally corrupt the disk contents. Some file systems, generally called "distributed disk file systems," such as VMware's VMFS, allow this type of sharing, but the guest OSs of the VMs being updated may not have drivers for such file systems. One, perhaps suboptimal, solution is not to share, and allow only one VM to access the repository disk at a time. In other words, hot-add the disk to a first VM, wait for the software update operation to complete, hot-remove the disk from the first VM, and then hot-add it to a second VM that needs updating, and so forth. This may result in low performance. Another solution is to share, but ensure that each guest VM accesses the file system of the repository disk in "read-only" mode. Various embodiments of the present invention can provide several solutions to the sharing problem. For example, if the guest OS (for example, GOS 3006) supports a "read-only" file system mounting mode, the guest agent (for example, GA 3004) instructs the guest OS to mount the repository disk's file system in such a mode. However, not all operating systems support this mode; for example the NTFS driver of Windows 2000 insists on mounting file systems in read-write mode. Another solution, in accordance with one or more embodiments of the present invention, is to allow the VM to access a logical copy of the disk. This takes advantage of a redo log (also called "disk snapshot") technology of most existing virtual infrastructure products to create a lightweight clone of the repository disk. Note that such a clone can be created quickly, and can take up very little space. The clone is backed by a redo log (also known as "differencing disk" in some virtual infrastructure products); it is a temporary file that can reside on any file system accessible to the host computer. The format and implementation of redo logs is well-known to those of ordinary skill in the art. It is understood that a redo log implicitly depends on its parent disk, in this case the repository disk.

When a payload residing on a repository disk is to be deployed to N virtual machines, in accordance with one or more embodiments of the present invention, the virtual machine infrastructure can create N separate lightweight clones of the disk. Each clone is then hot-added into its corresponding VM.

Figure 6:
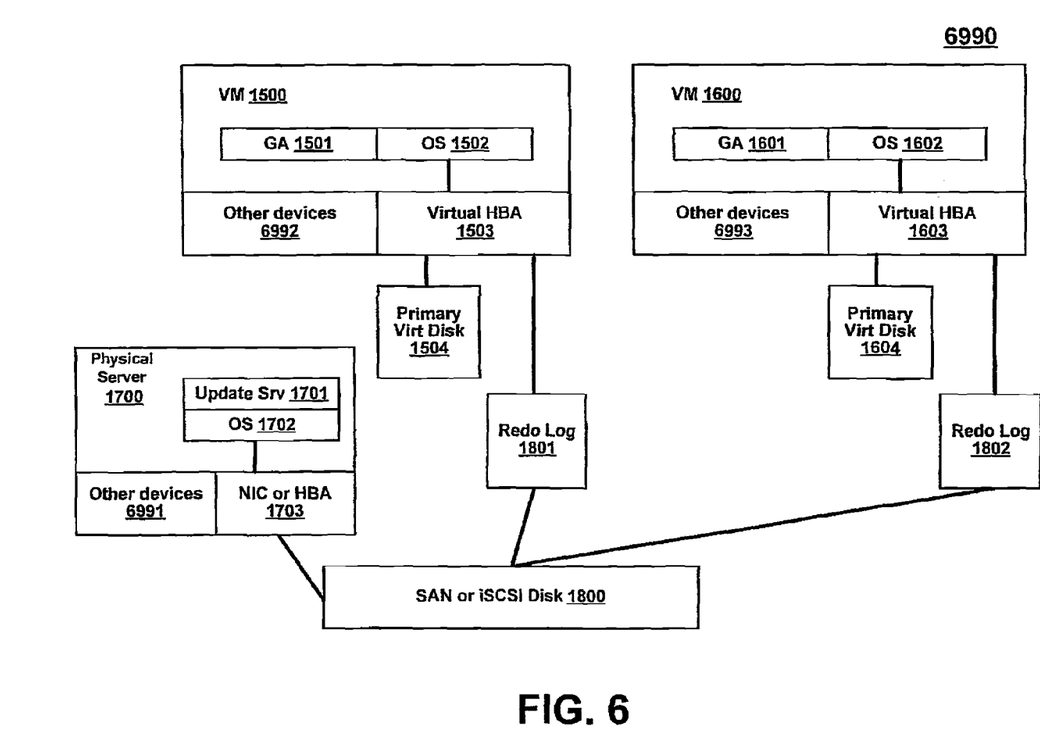
FIG. 6 is a block diagram of a virtual machine infrastructure that is fabricated in accordance with one or more embodiments of the present invention wherein virtual machines can be updated using payloads from the same physical repository disk, which physical repository disk is coupled via an IP network or a SAN to a server computer running update server software.

FIG. 6 is a block diagram of virtual machine infrastructure 6990 that is fabricated in accordance with one or more embodiments of the present invention wherein virtual machines 1500 and 1600 are updated using payloads from the same physical repository disk 1800, which physical repository disk 1800 is coupled via an IP network or a SAN to server computer 1700 running update server software 1701. In accordance with one or more such embodiments, server computer 1700 is a physical machine. When an update operation begins, update server 1701 instructs virtual machine infrastructure 6990 to create two lightweight clones of physical repository disk 1800, resulting in the creation of redo logs 1801 and 1802. Clones 1801 and 1802 are then dynamically coupled to virtual HBAs 1503 and 1603 of VMs 1500 and 1600, respectively. Even though repository disk 1800 is a physical disk, redo logs 1801 and 1802 can be virtual files, and can be placed on any file system accessible to VMMs managing VMs 1500 and 1600, respectively.

Virtual machine infrastructure 6990 shown in FIG. 6 includes physical server 1700, VMs 1500 and 1600, SAN or iSCSI disk 1800, primary virtual disk 1504, primary virtual disk 1604, and redo logs 1801 and 1802. As shown in FIG. 6, physical server 1700 includes update server 1701, OS 1702, NIC or HBA 1703, and other devices 6991. Specifically, in accordance with one or more such embodiments, update server 1701 is coupled to OS 1702, which, in turn, is coupled to NIC or HBA 1703, which in turn, is coupled to SAN or iSCSI disk 1800. In addition, as further shown in FIG. 6, VM 1500 includes GA 1501, OS 1502, virtual HBA 1503, and other devices 6992. Specifically, in accordance with one or more such embodiments, GA 1501 is coupled to OS 1502, which, in turn, is coupled to virtual HBA 1503, which, in turn, is coupled to primary virtual disk 1504 and redo log 1801. Redo logs 1801 and 1802 are each coupled to SAN or iSCSI disk 1800. In addition, as further shown in FIG. 6, VM 1600 includes GA 1601, OS 1602, virtual HBA 1603, and other devices 6993. Specifically, in accordance with one or more such embodiments, GA 1601 is coupled to OS 1602, which, in turn, is coupled to virtual HBA 1603, which, in turn, is coupled to primary virtual disk 1604 and redo log 1802. It should be understood that further embodiments of virtual machine infrastructure 6990 can include more or less components than those shown in FIG. 6.

Figure 5:
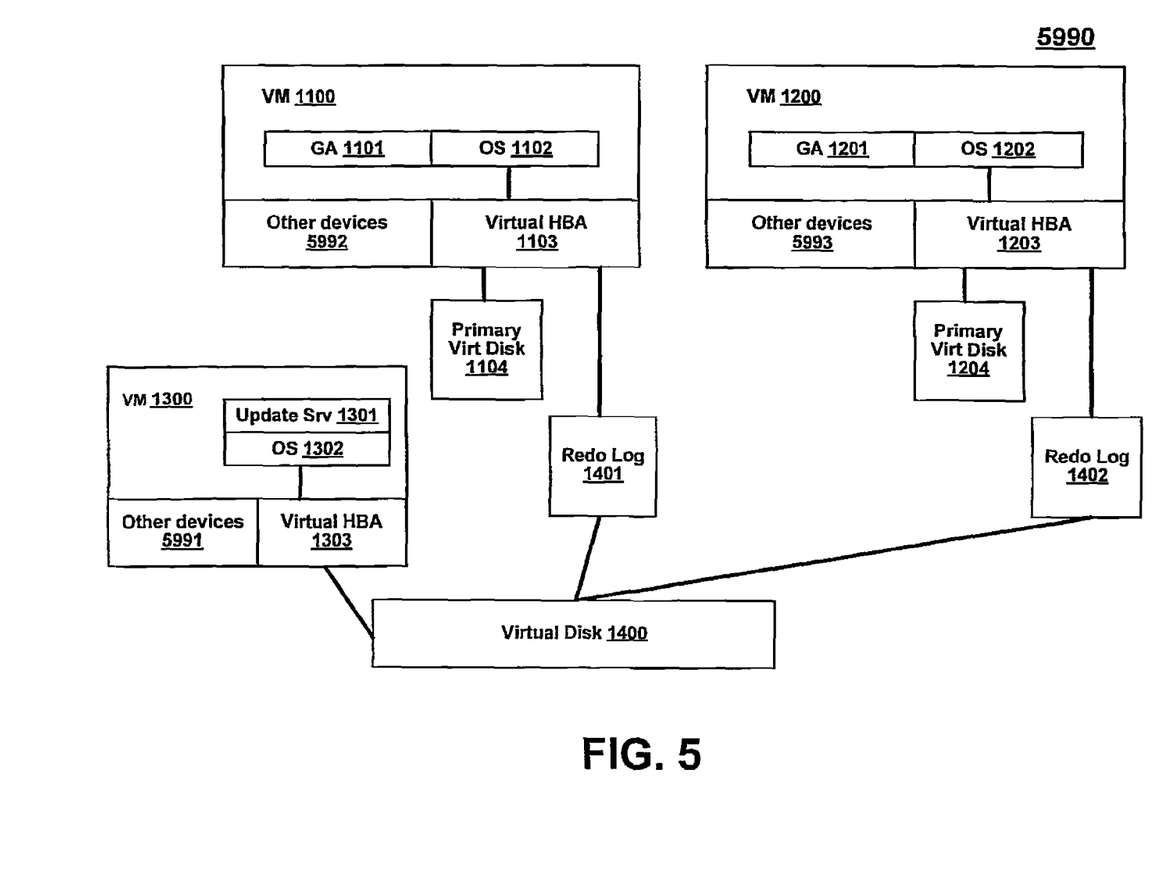
FIG. 5 is a block diagram of a virtual machine infrastructure that is fabricated in accordance with one or more embodiments of the present invention.

FIG. 5 is a block diagram of virtual machine infrastructure 5990 that is fabricated in accordance with one or more embodiments of the present invention. Note that virtual machine infrastructure 5990 is similar to virtual machine infrastructure 6990 of FIG. 6. However, for virtual machine infrastructure 5990 of FIG. 5, the server computer running update server software 1301 is a virtual machine (i.e., virtual machine 1300). In accordance with one or more such embodiments, the repository can be stored on virtual disk file 1400. Furthermore, redo logs 1401 and 1402, and the parent disk, are all virtual disk files. Virtual machine infrastructure 5990 shown in FIG. 5 includes VMs 1100, 1200, and 1300, virtual disk 1400, primary virtual disk 1104, primary disk 1204, and redo logs 1401 and 1402. VM 1300 includes update server 1301, OS 1302, virtual HBA 1303, and other devices 5991. Specifically, update server 1301 is coupled to OS 1302, which, in turn, can be coupled to virtual HBA 1303, which, in turn, can be coupled to virtual disk 1400. VM 1100 includes GA 1101, OS 1102, virtual HBA 1103, and other devices 5992. Specifically, GA 1101 is coupled to OS 1102, which, in turn, can be coupled to virtual HBA 1103, which, in turn, can be coupled to primary virtual disk 1104 and redo log 1401. Redo logs 1401 and 1402 can each be coupled to virtual disk 1400. VM 1200 includes GA 1201, OS 1202, virtual HBA 1203, and other devices 5993. Specifically, GA 1201 is coupled to OS 1202, which, in turn, can be coupled to virtual HBA 1203, which, in turn, can be coupled to primary disk 1204 and redo log 1402. It should be understood that further embodiments of virtual machine infrastructure 5990 can include more or less components than those shown in FIG. 5. Note that some guest operating systems, such as Linux, do not automatically mount the file systems of a newly attached disk. In such a situation, the guest agent (for example, GA 3004) can explicitly request the guest OS to perform the mount operation as soon as the guest agent detects the arrival of the new disk (for example, by polling the guest OS, or by registering to receive a notification from it). The guest agent can select a path in the file name space, and can then pass that path as the requested mount point to the guest OS. However, some guest operating systems have the opposite problem; that is, they mount file systems too eagerly. Windows XP, for example, automatically mounts the file systems of any newly detected disk. The mount points that it chooses tend to be "drive letters." This may have a side effect of displaying user-visible messages and windows on a VM's graphics screen. For instance, Windows XP automatically scans any new drive letter for multimedia files, and then offers users the ability to open any files found. Another problem can involve the existence of the new disk itself. For example, Windows XP sometimes displays a "new hardware found" message when a disk appears, and may even request a reboot, which is unnecessary. This message indicates that the OS is registering the new device, and installing drivers for it for the first time.

In accordance with one or more embodiments of the present invention, these issues are addressed as follows. To handle the "new hardware found" problem, the guest agent (for example, GA 3004 or 4004) can "trick" the guest OS (for example, GOS 3006 or 4006) into thinking that it has seen the new disk device before, and therefore does not need to register it again. The guest agent can do this by creating specific entries in the guest OS's device configuration database, before the disk is attached. For example, on Windows XP, those entries can be stored in the registry database in the following locations: HKLM\System\CurrentControlSet\Class and HKLM\System\CurrentControlSet\Enum\{SCSI or IDE}.

Note that correctly formatting the entries may involve knowledge of the disk's properties, such as bus number, vendor ID, and device ID. VIS 1002 can communicate this information to the guest agent (for example, GA 3004) as part of an initial setup message. VIS 1002 can also wait for an acknowledgment from the guest agent before hot-adding the disk to the VM. This can ensure that the entries are entered before the disk is added.

To solve the eager mount and drive letter scanning problem, the guest agent (for example, GA 3004 or 4004) can create configuration entries in the guest OS (for example, GOS 3006 or 4006) instructing it to disable automatic drive letter creation for any file systems originating from the disk about to be hot-added. For example, on Windows XP, those entries can be stored in the registry database in the following location: HKLM\System\MountedDevices.

It should be understood that correctly formatting those entries may involve knowledge of some properties of the disk and its file systems (for example, disk signature and file system offset within the disk). Once again, VIS 1002 can send this information to the guest agent as part of a setup message. Once the disk is added, the guest agent can explicitly mount the file system onto a hidden folder instead of a drive letter. This allows the guest agent to access the payload without interference from other software running in the guest.

When the guest agent finishes processing the payload, it dismounts the repository file system from the guest's file name space. It then returns a status to the VMM (e.g., 3015), HA (e.g., 3010) and VIS 1002 through the backdoor (for example, BD 3007). The virtual machine infrastructure can then disconnect the lightweight clone disk from the VM, and then can delete the clone (e.g., delete the redo log file).

The hot-add method, in accordance with one or more embodiments of the present invention, can be implemented on virtual machines equipped with a virtual HBA capable of accepting additional disk devices while the virtual machine is powered on. Some virtual machine products may not support such virtual HBA devices, for example, the number of disks attached to a virtual HBA is fixed at VM configuration time, and cannot be changed once the VM powers on.

Note that one or more embodiments of the hot-insert method can provide most of the benefits of the hot-add method, while having the additional advantage of using a virtual device typically available in contemporary virtual machines: a virtual CD-ROM or DVD-ROM drive. The following discussion of various embodiments uses a virtual CD by way of example, but is equally applicable to a DVD.

When a payload is ready to be deployed from a repository, in accordance with one or more embodiments of the present invention, the update controller (for example, it is assumed to be embedded within VIS 1002) dynamically creates an "image file" representing a virtual CD. VIS 1002 formats the image with a well-known CD file system such as ISO-9660, and copies the payload from the repository into the CD file system during formatting.

The image is placed on a file system accessible to the host computers that host the target virtual machine(s). In one embodiment, for each VM to be updated from the target: (1) VIS 1002 instructs the HA (for example, HA 3010) and/or VMM (for example, VMM 3015) of the applicable host computer to virtually insert the virtual CD into the VM's virtual CD-ROM drive. (2) VIS 1002 sends the update message to the VM's guest agent (for example, GA 3004).

The message contains information indicating that the payload is being delivered through the CD drive. (3) The guest agent (for example, GA 3004) locates the CD drive's mount point within the guest OS's file system name space, and then opens and processes the payload as necessary. (4) Once the update operation finishes, the guest agent (for example, GA 3004) returns a status code to VIS 1002 through the VMM (for example, VMM 3015) and/or the HA (for example, HA 3010). (5) VIS 1002 virtually ejects the virtual CD from the VM's virtual CD-ROM drive. It should be appreciated that when the virtual CD image file is no longer needed, VIS 1002 can delete it.

Note that the hot-insert method is not affected by the file sharing problem associated with the hot-add method described herein because virtual CD/DVD file systems can be read-only by definition. Therefore, no guest operating system (for example, GOS 3006) or VM (for example, VM 3001) can modify the contents of the file system. It is therefore possible for multiple VMs (for example, VMs 3001 and 4001) to access the same CD/DVD image at the same time, without the need to create a lightweight clone of the image for each VM.

To provide some optimization, update server 1001, if integrated with VIS 1002, can use the virtual CD or DVD itself as the repository. As such, when a new payload is to be added to the repository, update server 1001 can update the CD/DVD image file to contain the new payload. This optimization can save one data transfer operation. It can also imply that the virtual CD or DVD is permanent and does not get deleted after an update operation.

Figure 2:
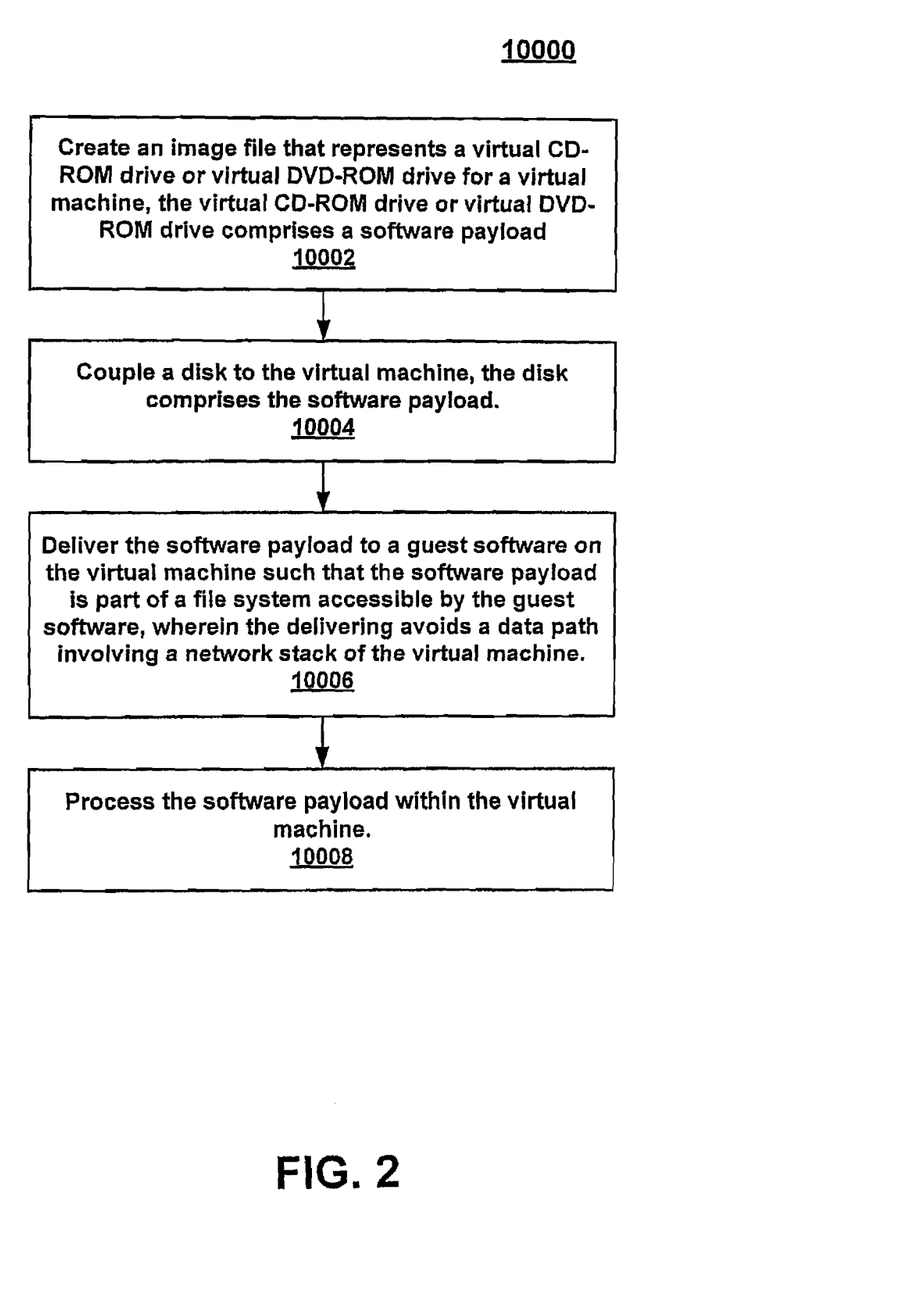
FIG. 2 is an exemplary flow diagram in accordance with one or more embodiments of the present invention.

FIG. 2 is a flow diagram of method 10000 for delivering software to one or more virtual machines in accordance with various embodiments of the invention. Method 10000 can include processes that, in various embodiments, are carried out by a physical or virtual processor under the control of computer-readable and computer-executable instructions. Although specific steps are disclosed in method 10000, such steps are exemplary. Method 10000 may not include all of the operations illustrated by FIG. 2. Also, method 10000 may include various other operations and/or variations of the operations shown by FIG. 2. Likewise, the sequence of the operations of method 10000 can be modified. It is noted that the operations of method 10000 can be performed by software, by firmware, by electronic hardware, manually, or by any combination thereof.

In accordance with method 10000, an image file that represents a virtual CD-ROM drive or virtual DVD-ROM drive for a virtual machine is created which includes a software payload. Then, the drive is coupled to the virtual machine. Then, the software payload is delivered to guest software on the virtual machine so that the software payload is part of a file system accessible by the guest software. Note that delivering the software payload this way avoids a data path involving a network stack of the virtual machine. Then, the software payload can be processed within the virtual machine.

At step 10002 of FIG. 2, an image file is created that represents a virtual CD-ROM drive or virtual DVD-ROM drive for a virtual machine, wherein the virtual CD-ROM drive or virtual DVD-ROM drive includes a software payload (for example, payload 2003, payload 5004, and the like). Note that step 10002 can be implemented in a wide variety of ways. For example, step 10002 can be implemented in any manner similar to that described herein, but is not limited to such.

At step 10004 of FIG. 2, the drive is coupled to the virtual machine. It is understood that step 10004 can be implemented in a wide variety of ways. For example, step 10004 can be implemented in any manner similar to that described herein, but is not limited to such.

At step 10006 of FIG. 2, the software payload is delivered to guest software on the virtual machine so that the software payload is part of a file system accessible by the guest software. It is appreciated that step 10006 can be implemented in a wide variety of ways. For example, step 10006 can be implemented in any manner similar to that described herein, but is not limited to such.

At step 10008, the software payload is processed within the virtual machine. Note that step 10008 can be implemented in a wide variety of ways. For example, step 10002 can be implemented in any manner similar to that described herein, but is not limited to such. At the completion of step 10008, method 10000 can be exited.

Unless specifically stated otherwise as apparent from the following discussions, it is appreciated that throughout the present detailed description, discussions utilizing terms such as "delivering", "utilizing", "processing", "creating", "determining", "coupling", "attaching", "formatting", "generating", "accessing", or the like, refer to the actions and processes of a computer system, virtual machine, or similar electronic computing device. The computer system (virtual machine or similar electronic computing device) manipulates and transforms data represented as physical (electronic) quantities within the computer system's registers and memories into other data similarly represented as physical quantities within the computer system memories or registers or other such information storage, transmission, or display devices. The invention is also well suited to the use of other computer systems such as, for example, optical computers or virtual machines.

The foregoing descriptions of various specific embodiments in accordance with the invention have been presented for purposes of illustration and description. They are not intended to be exhaustive or to limit the invention to the precise forms disclosed, and obviously many modifications and variations are possible in light of the above teaching. The invention can be construed according to the Claims and their equivalents.

APPENDIX

Figure 1:
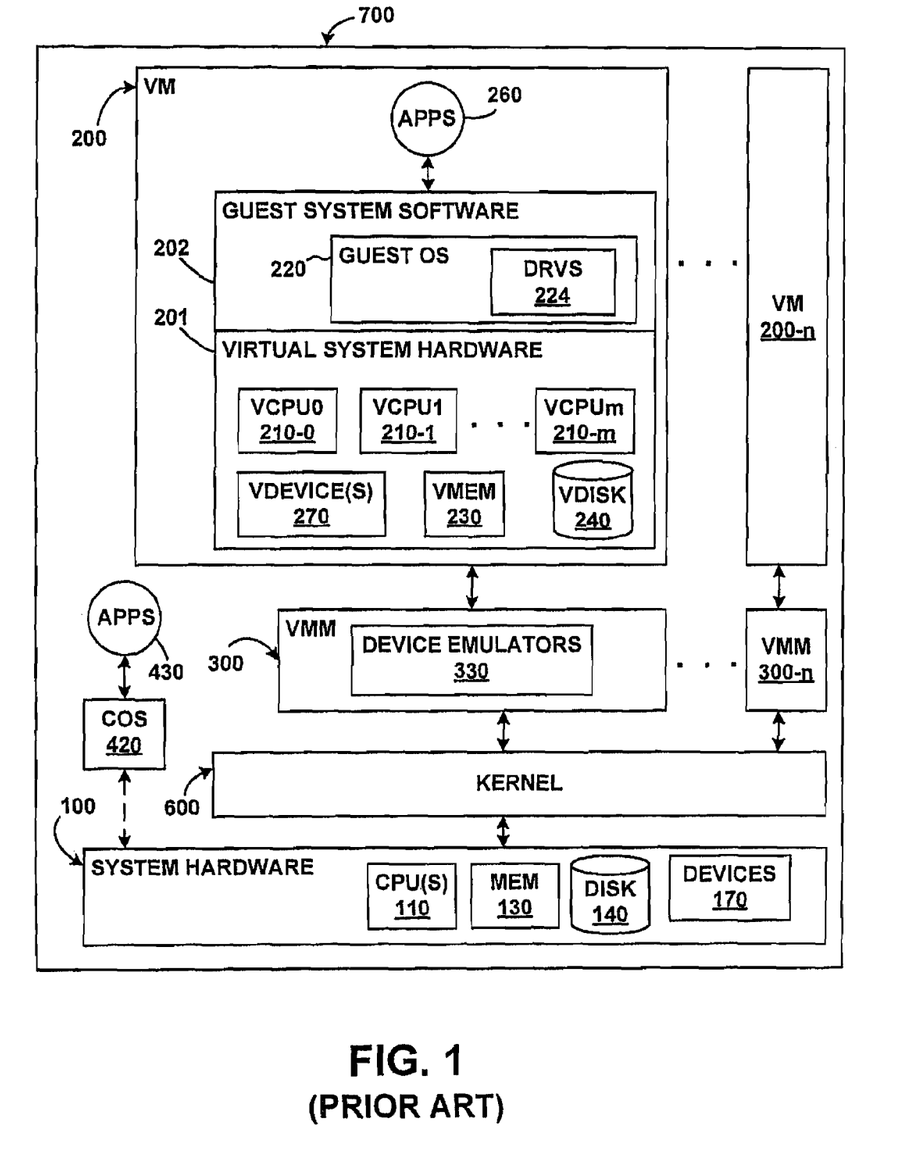
FIG. 1 shows a virtualized computer system in which one or more embodiments of the present invention may operate.

As is well known in the field of computer science, a virtual machine (VM) is an abstraction—a "virtualization"—of an actual physical computer system. FIG. 1 shows one possible arrangement of computer system 700 that implements virtualization. A virtual machine (VM) or "guest" 200 is installed on a "host platform," or simply "host," which includes system hardware, that is, hardware platform 100, and one or more layers or co-resident components comprising system-level software, such as an operating system or similar kernel, or a virtual machine monitor or hypervisor (see below), or some combination of these. The system hardware typically includes one or more processors 110, memory 130, some form of mass storage 140, and various other devices 170.

Each VM 200 (including VM 200 and additional "n" number of VMs 200-*n*) will typically have both virtual system hardware 201 and guest system software 202. The virtual system hardware typically includes at least one virtual CPU, virtual memory 230, at least one virtual disk 240, and one or more virtual devices 270. Note that a disk—virtual or physical—is also a "device," but is usually considered separately because of the important role of the disk. All of the virtual hardware components of the VM may be implemented in software using known techniques to emulate the corresponding physical components. The guest system software includes guest operating system (OS) 220 and drivers 224 as needed for the various virtual devices 270.

Note that a single VM may be configured with more than one virtualized processor; FIG. 1 illustrates multiple virtual processors 210-0, 210-1, ..., 210-*m* (VCPU0, VCPU1, ..., VCPUm) within VM 200. For example, symmetric multi-processor (SMP) systems exist wherein a hardware platform wherein multiple processors are connected to a shared main memory and shared I/O devices— VMs may configured as SMP VMs. In addition, multi-processor systems exist in a so-called "multi-core" architecture) wherein more than one physical CPU is fabricated on a single chip and having its own set of functional units (such as a floating-point unit and an arithmetic/logic unit ALU), and where threads can be executed independently; multi-core processors typically share limited resources, such as some cache—VMs may be configured as multi-core systems. In addition, simultaneous execution of multiple threads in which more than one logical CPU operates simultaneously on a single chip, but in which the logical CPUs flexibly share one or more resources such as caches, buffers, functional units, etc. One or more embodiments of the present invention may be used regardless of the type—physical and/or logical—or number of processors included in a VM.

As is well known, "virtualization software" interfaces between guest software within a VM and various hardware components and devices in the underlying hardware platform. The virtualization software may include one or more software components and/or layers, possibly including one or more of the software components known in the field of virtual machine technology as "virtual machine monitors" (VMMs) 300, 300*n*, "hypervisors," or virtualization "kernels." Because virtualization terminology has evolved over time and has not yet become fully standardized, these terms do not always provide clear distinctions between the software layers and components to which they refer. For example, the term "hypervisor" is often used to describe both a VMM and a kernel together, either as separate but cooperating components or with one or more VMMs (300-300*n*) incorporated wholly or partially into the kernel itself; however, the term "hypervisor" is sometimes used instead to mean some variant of a VMM alone, which interfaces with some other software layer(s) or component(s) to support virtualization. Moreover, in some systems, some virtualization code is included in at least one "superior" VM to facilitate the operations of other VMs. Furthermore, specific software support for VMs may be included in the host OS itself. Unless otherwise indicated, one or more embodiments of the present invention may be used in virtualized computer systems having any type or configuration of virtualization software.

FIG. 1 shows VMMs that appear as separate entities from other components of virtualization software. Furthermore, some software components used to implemented one illustrated embodiment of the present invention are shown and described as being within a "virtualization layer" located logically between all virtual machines and the underlying hardware platform and/or system-level host software. This virtualization layer can be considered part of the overall virtualization software, although it would be possible to implement at least part of this layer in specialized hardware. Again, unless otherwise indicated or apparent from the description below, it is to be assumed that one or more embodiments of the present invention can be implemented anywhere within the overall structure of the virtualization software, and even in systems that provide specific hardware support for virtualization.

Various virtualized hardware components in VM 200, such as the virtual CPU(s), virtual memory 230, virtual disk 240, and virtual device(s) 270, are shown as being part of VM 200 for the sake of conceptual simplicity. In accordance with or more embodiments of the present invention, one or more of these virtualized hardware components are implemented as software emulations 370 included in VMM 300.

Different systems may implement virtualization to different degrees—"virtualization" generally relates to a spectrum of definitions rather than to a bright line, and often reflects a design choice with respect to a trade-off between speed and efficiency on the one hand and isolation and universality on the other hand. For example, "full virtualization" is sometimes used to denote a system in which no software components of any form are included in the guest other than those that would be found in a non-virtualized computer; thus, the guest OS could be an off-the-shelf, commercially available OS with no components included specifically to support use in a virtualized environment.

In contrast, another concept, which has yet to achieve a universally accepted definition, is that of "para-virtualization." As the name implies, a "para-virtualized" system is not "fully" virtualized, but rather the guest is configured in some way to provide certain features that facilitate virtualization. For example, the guest in some para-virtualized systems is designed to avoid hard-to-virtualize operations and configurations, such as by avoiding certain privileged instructions, certain memory address ranges, etc. As another example, many para-virtualized systems include an interface within the guest that enables explicit calls to other components of the virtualization software.

For some, para-virtualization implies that the guest OS (in particular, its kernel) is specifically designed to support such an interface. According to this view, having, for example, an off-the-shelf version of Microsoft Windows XP as the guest OS would not be consistent with the notion of para-virtualization. Others define para-virtualization more broadly to include any guest OS with any code that is specifically intended to provide information directly to any other component of the virtualization software. According to this view, loading a module such as a driver designed to communicate with other virtualization components renders the system para-virtualized, even if the guest OS as such is an off-the-shelf, commercially available OS not specifically designed to support a virtualized computer system. Unless otherwise indicated or apparent, this invention is not restricted to use in systems with any particular "degree" of virtualization and is not to be limited to any particular notion of full or partial ("para-") virtualization.

In addition to the sometimes fuzzy distinction between full and partial (para-) virtualization, two arrangements of intermediate system-level software layer(s) are in general use—a "hosted" configuration (which is shown in FIG. 2) and a non-hosted configuration (which is shown in FIG. 1). In a hosted virtualized computer system, an existing, general-purpose operating system forms a "host" OS that is used to perform certain input/output (I/O) operations, alongside and sometimes at the request of the VMM. As shown in FIG. 2, host OS 450, which usually includes drivers 454 and supports applications 460 of its own, and VMM 300 are both able to directly access at least some of the same hardware resources, with conflicts being avoided by a context-switching mechanism. The Workstation product of VMware, Inc., of Palo Alto, Calif., is an example of a hosted, virtualized computer system, which is also explained in U.S. Pat. No. 6,496,847 (Bugnion, et al., "System and Method for Virtualizing Computer Systems," 17 Dec. 2002).

In addition to device emulators 370, FIG. 2 also illustrates some of the other components that are also often included in the VMM 300 of a hosted virtualization system; many of these components are found in the VMM 300 of a non-hosted system as well. For example, interrupt/exception handlers 330 (int/expt 330) may be included to help context-switching, and direct execution engine 310 and binary translator 320 with associated translation cache 325 may be included to provide execution speed while still preventing the VM from directly executing certain privileged instructions.

As illustrated in FIG. 1, in many cases, it may be beneficial to deploy VMMs on top of a software layer—kernel 600—constructed specifically to provide efficient support for the VMs. This configuration is frequently referred to as being "non-hosted." Compared with a system in which VMMs run directly on the hardware platform, use of a kernel offers greater modularity and facilitates provision of services (for example, resource management) that extend across multiple virtual machines. Compared with a hosted deployment, a kernel may offer greater performance because it can be co-developed with the VMM and be optimized for the characteristics of a workload consisting primarily of VMs/VMMs. Kernel 600 also handles any other applications running on it that can be separately scheduled, as well as a console operating system that, in some architectures, is used to boot the system and facilitate certain user interactions with the virtualization software.

Note that kernel 600 is not the same as the kernel that will be within the guest OS 220. Note also that kernel 600 is part of the "host" platform of the VM/VMM as defined above even though the configuration shown in FIG. 1 is commonly termed "non-hosted;" moreover, the kernel may be both part of the host and part of the virtualization software or "hypervisor." The difference in terminology is one of perspective and definitions that are still evolving in the art of virtualization.

What is claimed is:

1. A computer implemented method for delivering a software payload to a virtual machine that comprises:
    sending a message to a guest agent of the virtual machine instructing it to prepare for an update operation, wherein the message includes: (a) how the software payload will be delivered; (b) a location of the software payload in the guest's file name space; and (c) instructions on how to process the software payload;
    establishing a data path from the software payload to the virtual machine and the guest agent of the virtual machine;
    delivering the software payload to the guest software on the virtual machine so that the software payload is part of a file system accessible by the guest software, wherein delivering utilizes a virtual device of the virtual machine but does not involve any virtual network interface card (NIC) or any virtual host bus adapter (VHBA) of the virtual machine;
    processing the software payload within the virtual machine;
    waiting for reception of a status from the guest agent, wherein the status relates to the processing of the software payload; and
    after reception of the status indicating completion of the processing of the software payload, deactivating the data path.

2. The computer implemented method of claim 1 wherein delivering further comprises:
    creating an image file that represents a virtual CD for the virtual machine, the virtual CD being the virtual device, the virtual CD including the software payload; and
    after creating, inserting the virtual CD into a virtual CD drive of the virtual machine.

3. The computer implemented method of claim 1 wherein delivering further comprises:
    creating an image file that represents a virtual DVD for the virtual machine, the virtual DVD being the virtual device, the virtual DVD disc including the software payload; and
    after creating, inserting the virtual DVD into a virtual DVD drive of the virtual machine.

4. The computer implemented method of claim 1, further comprising:
    coupling a disk to the virtual machine, the disk including the software payload.

5. The computer implemented method of claim 4, wherein the disk is a virtual disk file.

6. The computer implemented method of claim 4, wherein the disk is a physical disk.

7. The computer implemented method of claim 1, further comprising:
    determining a delivery method for the delivering based on a configuration of the virtual machine and a capability of a virtual infrastructure hosting the virtual machine.

8. The computer implemented method of claim 1, wherein the establishing the data path comprises:
    utilizing a virtual disk file that comprises the software payload.

9. The computer implemented method of claim 1, wherein the establishing the data path comprises:
    creating an image file that represents a virtual disc for the virtual machine, the virtual disc comprises the software payload; and
    after the creating, inserting the virtual disc into a virtual drive attached to the virtual machine, wherein the virtual disc is selected from the group consisting of a virtual CD or a virtual DVD.

10. The computer implemented method of claim 1, further comprising:
    communicating to the guest agent a configuration of the data path and a location of the software payload in a file system name space of the guest agent.

11. Instructions on a non-transitory computer-usable medium wherein the instructions when executed cause a computer system to perform method for delivering a software payload to a virtual machine, the method comprising:
    sending a message to a guest agent of the virtual machine instructing it to prepare for an update operation, wherein the message includes: (a) how the software payload will be delivered; (b) a location of the software payload in the guest's file name space; and (c) instructions on how to process the software payload;
    establishing a data path from the software payload to the virtual machine and the guest agent of the virtual machine;
    delivering the software payload to the guest software on the virtual machine so that the software payload is part of a file system accessible by the guest software, wherein delivering utilizes a virtual device of the virtual machine but does not involve any virtual network interface card (NIC) or any virtual host bus adapter (VHBA) of the virtual machine;

processing the software payload within the virtual machine;

waiting for reception of a status from the guest agent, wherein the status relates to the processing of the software payload; and after reception of the status indicating completion of the processing of the software payload, deactivating the data path.

12. The instructions of claim 11, wherein delivering comprises:

utilizing the virtual device of the virtual machine for delivering the software payload;

creating an image file that represents a virtual CD for the virtual machine, the virtual CD including the software payload; and after creating, inserting the virtual CD into a virtual CD drive of the virtual machine.

13. The instructions of claim 11, wherein delivering further comprises:

creating an image file that represents a virtual DVD for the virtual machine, the virtual DVD being the virtual device, the virtual DVD disc including the software payload; and after creating, inserting the virtual DVD into a virtual DVD drive of the virtual machine.

14. A computer implemented method for delivering a software payload to a virtual machine that comprises:

a guest agent running in the virtual machine;

the virtual machine running on a virtual machine host having a communications channel to the guest agent;

storing the software payload in a repository;

sending a message to the guest agent instructing it to prepare for an update operation, wherein the message includes: (a) how the software payload will be delivered; (b) a location of the software payload in the guest's file name space; and (c) instructions on how to process the software payload;

establishing a data path from the software payload to the virtual machine and the guest agent;

delivering the software payload to guest software running on the virtual machine so that the software payload is part of a file system accessible by the guest software, including delivering the software payload to the guest software through an input/output (I/O) port that is a backdoor software communication pipe, wherein delivering does not involve any virtual network interface card (NIC) or any virtual host bus adapter (VHBA) of the virtual machine;

the guest agent processing the software payload using pre-negotiated or explicitly specified instructions;

when processing finishes, the guest agent returning a status, wherein the status relates to the processing of the software payload; and after reception of the status indicating completion of the processing of the software payload, deactivating the data path.

15. The method of claim 14 wherein:

the software payload comprises software updates and an installation program or script, which installation program or script runs inside the virtual machine.

16. The method of claim 15 wherein the installation program or script applies and/or executes the software updates.

17. The method of claim 16 wherein the installation program or script sends commands to a guest operating system.

18. The method of claim 14 wherein:

sending the message comprises processing by a combination of virtual machine host software and the backdoor.

19. The method of claim 14 wherein:

the instructions include one or more of the following: (1) uncompressing and unpacking the software payload if it is an archive of files, (ii) copying files to specific folders of the guest, (iii) launching executable program files, (iv) rebooting the guest operating system, and (v) deleting files.

20. The method of claim 14 wherein:

the repository is in a private file system on a disk that is directly attached to a server computer;

the method comprising:

the server computer copying the software payload over a network to a cache on the virtual machine host, the cache being a folder on a file system directly accessible by the virtual machine host; and once the cache holds a copy of the software payload, instructing the virtual machine host to transfer the payload contents into the guest through the backdoor.

21. The method of claim 20 which comprises the virtual machine host negotiating with the guest agent to determine where in the guest's file system space the copy of the payload will be placed.

22. The method of claim 21 wherein the method comprises the guest agent selecting a folder that the guest operating systems uses to store temporary files.

23. The method of claim 14 wherein:

the repository resides on a file system visible to the virtual machine host; and the method comprises the virtual machine host copying the payload from the repository into the guest.

24. The method of claim 14 wherein:

a file sharing component is enabled in the guest;

and the method comprises instructing the virtual machine host to create a virtual file system within the guest, and to map that file system directly to a specific file system folder visible to the virtual machine host, which folder is the repository.

25. The method of claim 14 wherein the method comprises:

placing the repository on a file system residing on a disk;

attaching the disk to the virtual machine by connecting the disk to a virtual host bus adapter.

26. The method of claim 25 wherein the method comprises:

the guest operating system mounting the disk's file systems onto the guest's file name space.

27. The method of claim 26 wherein the repository is on a virtual disk file.

28. The method of claim 14 which comprises:

creating and formatting an image file representing a virtual CD or DVD;

copying the payload from the repository into the CD or DVD file system during formatting;

placing the image on a file system accessible to the virtual machine host for the virtual machine;

instructing the virtual machine host to virtually insert the virtual CD or DVD into the VM's virtual CD or DVD drive;

sending an update message to the guest agent, the message containing information indicating that the software payload is being delivered through the CD or DVD drive;

the guest agent locating the CD or DVD drive's mount point within the guest operating system OS's file system name space;

the guest agent opening and processing the software payload; and virtually ejecting the virtual CD or DVD from the VM's virtual CD or DVD drive.

29. The method of claim 1, further comprising determining an infrastructure configuration type of the virtual machine, wherein delivering the software payload comprises based on the infrastructure configuration type of the virtual machine, copying the software payload to a cache, copying the software payload directly from a file system that is visible to the guest software or creating a virtual file system within the guest software.

* * * * *